May 25, 1926.  1,586,070
H. L. COOKE
METHOD OF TAKING PHOTOGRAPHS AND CAMERA MOUNTING
FOR USE IN CONNECTION THEREWITH
Filed August 3, 1921  2 Sheets-Sheet 1
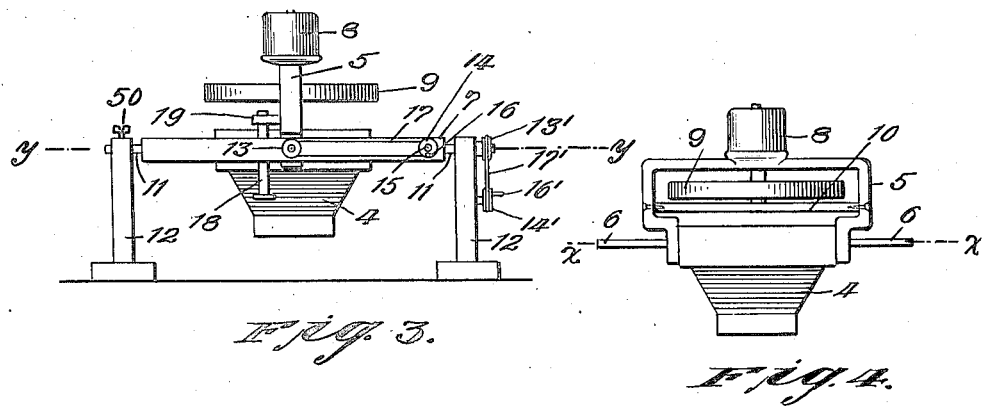
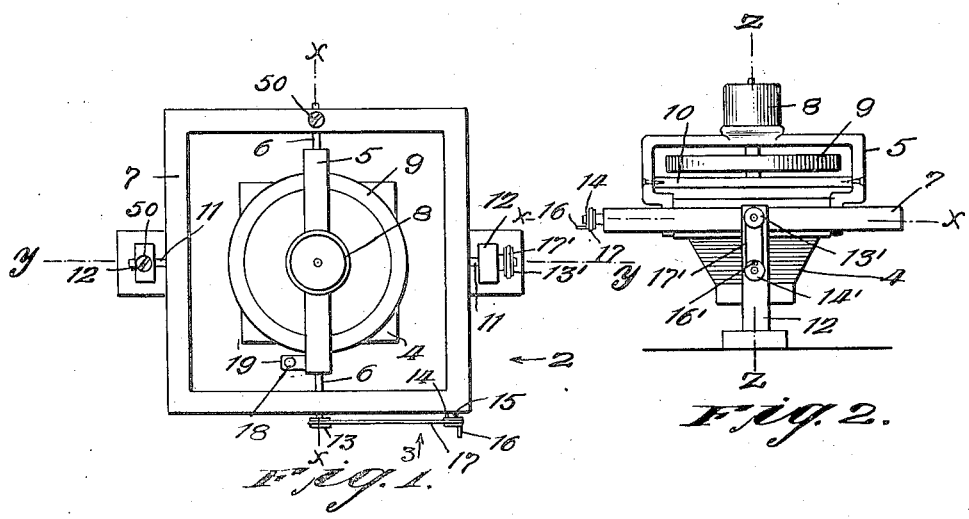
INVENTOR
H. Lester Cooke,
BY
Moses, Hammond, Moore & Nolte
ATTORNEYS May 25, 1926. 1,586,070
H. L. COOKE
METHOD OF TAKING PHOTOGRAPHS AND CAMERA MOUNTING
FOR USE IN CONNECTION THEREWITH
Filed August 5, 1921 2 Sheets-Sheet 2
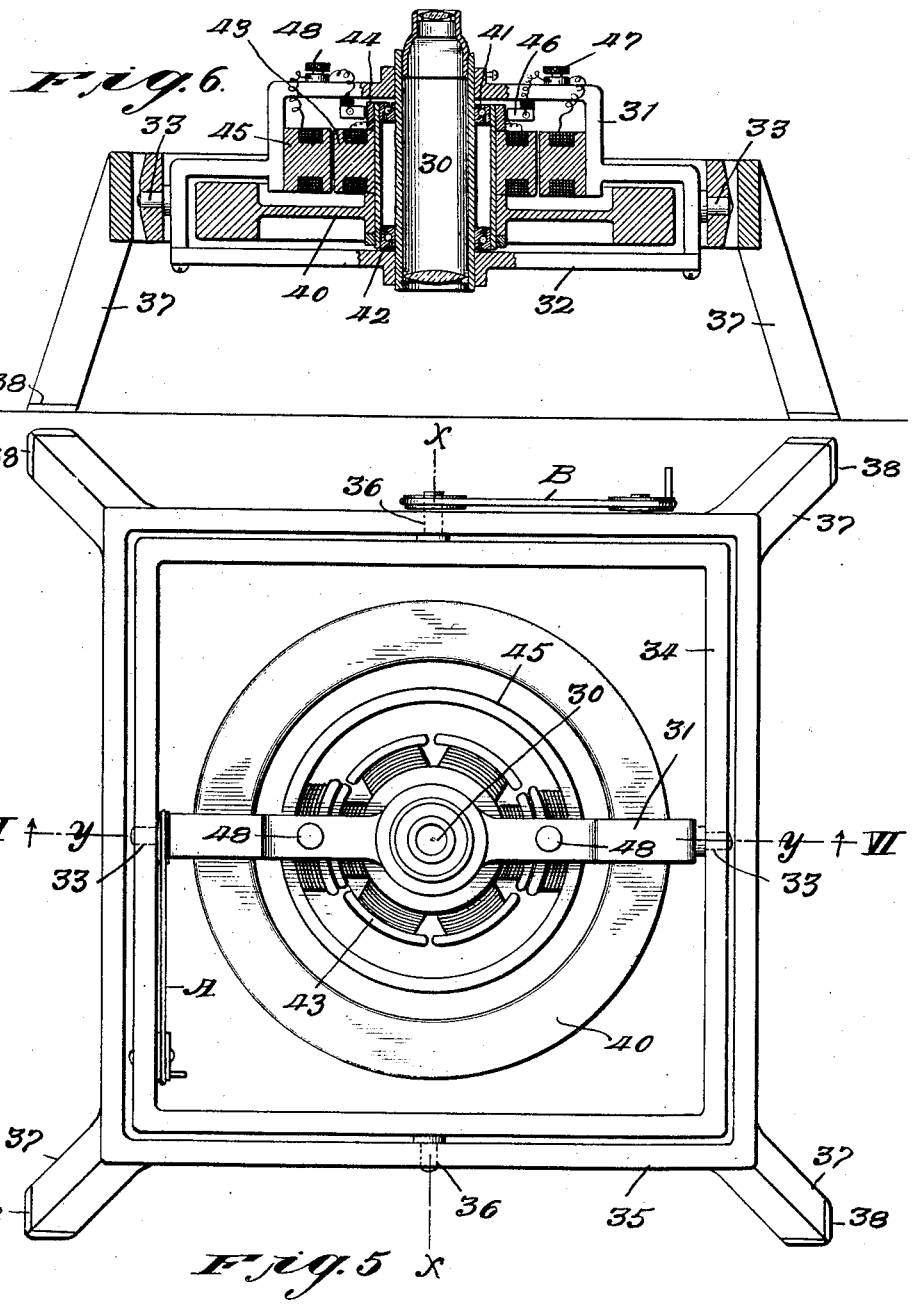
INVENTOR
H. Lester Cooke
BY
Meres, Hammond, Morse
& Nolte
ATTORNEYS.

Patented May 25, 1926.

1,586,070

UNITED STATES PATENT OFFICE.

HEREWARD LESTER COOKE, OF PRINCETON, NEW JERSEY, ASSIGNOR TO AERO SURVEY CORPORATION, A CORPORATION OF DELAWARE.

METHOD OF TAKING PHOTOGRAPHS AND CAMERA MOUNTING FOR USE IN CONNECTION THEREWITH.

Application filed August 3, 1921. Serial No. 489,507.

This invention is related to methods of and means for mounting optical instruments or other apparatus on a platform in such a manner that the direction in which the apparatus points may be made to alter in a uniform manner, so as to compensate for any change in relative position between the platform and objects with which the said apparatus is to be kept in alignment. The principle on which the action of the apparatus depends is that of gyroscopic precession said precession being under adjustable control as hereinafter described.

The invention is applicable to the mounting of aeroplane cameras to compensate for the apparent angular motion of the ground, as seen from the moving aeroplane, but may also be applied to the mounting of instruments of observation, such as telescopes or range-finders, or to moving picture cameras, where there is relative motion between the platform on which the said telescope, rangefinder or moving-picture camera is mounted, and the object with which the said instruments are to be kept in alignment.

A good understanding of the invention may now be had from the following description of certain forms of embodiment thereof, illustrated in the accompanying drawing, in which:—

Figure 1 is a plan view of one form of apparatus embodying the invention;

Figures 2 and 3 are side elevations of Figure 1, taken in the direction of arrows 2 and 3, respectively;

Figure 4 is a side view of part of the apparatus of Figures 1 to 3, inclusive;

Figure 5 is a plan view of a modification of Figure 1; and

Figure 6 is a section of Figure 5, on lines VI—VI, looking in the direction of the arrows.

Similar characters of reference designate similar parts in each of the several views.

Referring to the drawing, 4 is the aeroplane camera, which is rigidly attached to the yoke 5, which has trunnions 6 for supporting said camera yoke and associated mechanism rotatably about the axis X—X in the movable gimbal frame 7. An electric motor 8 is rigidly mounted on the yoke 5, as shown. A heavy gyrostat wheel 9 is supported between the yoke 5 and a cross support 10 rigidly attached to the yoke 5. The motor 8 and the gyrostat wheel 9, connected by a universal joint, not shown, are mounted with their axes of rotation coincident, and preferably also coincident with the axis Z—Z of the camera 4. The gimbal frame 7, in which the trunnions 6 are supported, is itself rotatably supported about the axis Y—Y normal to the axis X—X by means of trunnions 11 resting in the supporting standards 12. A grooved wheel 13 is rigidly attached to one of the trunnions 6, as shown. Another grooved wheel 14 is mounted on the pin 15, which is secured to the gimbal frame 7, and moves stiffly on said pin 15, being rotatably operated by the handle 16. An extensible elastic band 17 engages with the grooves in the wheels 13 and 14, as shown. Any adjustment of the angular position of the wheel 14, by means of the handle 16, will thus put a torque on the trunnions 6, tending to cause the movable system, including the camera 4 supported by said trunnions, to rotate about the axis X—X. A similar device for putting a torque about the axis Y—Y of the trunnions 11 is shown as comprising the grooved wheel 13' rigidly attached to the trunnion 11 and the stiffly moving wheel 14', operated by the handle 16'; the two grooved wheels 13' and 14' being connected by the elastic band 17'. It is evident that rotation of the grooved wheel 14' by means of this mechanism will put a torque on the camera A about the axis Y—Y.

A telescope 18 is attached rigidly by means of the bracket 19 to the yoke 5, and thus maintains rigidly its angular position relative to the camera 4. This telescope 18 is supplied with two cross wires parallel, respectively, to the axes X—X and Y—Y.

The operation of the instrument may now be considered: The camera is mounted by means of the standards 12 in the aeroplane. When the photographs are to be taken, the electric motor 8 is operated so as to communicate a high angular speed to the gyrostat wheel 9. By a well-known principle of gyroscopic action, when a torque is put on the camera 4 about the axis X—X with the gyrostat wheel rotating about the axis Z—Z, precession of the said camera about the axis Y—Y will be effected; and vice versa, a torque about the axis Y—Y producing precession about the X—X axis.

The operator watches the image of the ground in the telescope 18, and in general, notes that there is relative motion between the image of the ground and the cross wires of the telescope. By operating the handle 16 and putting a torque on the camera 4 about the axis X—X, he is able to produce precession of the gyroscope about the axis Y—Y, so that the component at right angles to the axis Y—Y of the apparent relative movement of the image of the ground and the cross wires of the telescope is eliminated. Having effected this first adjustment, he then operates the handle 16' in such a way that by the resulting precession of the gyroscope about the axis X—X, the component at right angles to the axis X—X of the apparent relative movement between the image of the ground and the cross wires of the telescope is eliminated. By successive approximate adjustments, if necessary, carried out as described alternately with wheels 14 and 14', the image of the ground and the cross wires may be made to remain stationary with respect to each other, while the camera is precessing through the approximate camera position in which the photograph or photographs, are to be taken.

The camera is then tilted back by hand into approximate position in which the photograph is to be taken, either vertical or oblique, and then the exposure of the plate is effected with the gyrostat wheel running uniformly and the torques governed by the wheels 14 an 14' undisturbed. It is obvious, since the telescope 18, by means of which the adjustments of the torques have been tested, and the camera 4, are rigidly connected, that during the exposure, there will be no appreciable movement of the photographic image on the plate. In this way, much longer durations of exposure of photographic plates may be employed in aeroplane photography without showing the effect of movement of the aeroplane or camera, and thus slow, wide angle lenses may be employed, and much greater areas of ground included in each exposure.

For the successful operation of this mounting of aeroplane camera, it is necessary that the electric motor 8 should be kept running uniformly and that the aeroplane should maintain uniform conditions of flight during the adjustment of wheels 14 and 14', and the subsequent exposure of the plate or plates. It is to be noted that a series of photographs covering a strip of ground may be successively taken with the one initial adjustment, as described, of the two wheels 14 and 14', provided the camera is swung back by hand between each exposure to the approximate position in accordance with which the adjustment of the wheels 14 and 14' was effected, and the aeroplane maintains its steady flight both with regard to direction and speed. It is important that the position of the center of mass of the camera and gimbal frame 7 be so adjusted that the apparatus will remain in neutral equilibrium about the two axes X—X and Y—Y, no matter how the angular position of the camera 4 about these two axes is adjusted. In other words, the intersection of the axes X—X and Y—Y and the center of mass of the whole movable system should coincide or, in other words, the apparatus should not be subject to gravitational control of any kind. It is also of course important that the center of mass of the camera should not be altered by changing plates or film. Methods for accomplishing this condition are well known and need not be described.

The method of applying adjustable torsional control about the two axes of gimbal suspension described, illustrates a simple method of applying torques about these axes. However, any other method of applying adjustable torques about these two axes which may be found suitable may be employed, such as springs, spiral springs, electric motors, whose torque may be varied in direction and magnitude, or vaned wheels operated by currents of air, or any similar device. It is also important that all bearings should work with great smoothness, and in practice it has been found important to have adjustable devices such as the friction screws 50, attached to the gimbal bearings whereby friction about the X—X and Y—Y axes may be increased for the purpose of diminishing small nutational and other oscillations of the gyroscope, that the gyroscopic wheel 9 should be accurately balanced, that the apparatus should be carefully shielded from air currents, and that the adjustable torques applied to the two axes X—X and Y—Y should not vary appreciably as the camera moves precessionally to compensate for the apparent angular velocity of the ground, as seen from a moving aeroplane.

It is quite obvious that a similar type of mounting and similar method of operation may be employed in mounting instruments, such as telescopes and range-finders or moving-picture cameras on ships or other moving platforms, or on fixed platforms, when there is relative approximately uniform motion between the observing instrument and the object observed having any component at right angles to the line of sight. In particular, the telescope 18, or one gyroscopically controlled in a similar manner, may be employed in aeroplanes for distinguishing detail on the ground, such as battery camouflages, screened trenches and other objects in warfare. In the mounting of telescopes, range finders, moving-picture cameras, etc., it is not in general essential that the alignment of the instrument with any given object in the field of view should remain absolutely fixed, but rather that the apparent motion of the object viewed, as seen in the instrument, should be reasonably slow and uniform. Gyroscopic precession, controlled as hereinbefore described, is capable of supplying this type of motion with ease and certainty.

In applying the principle of this invention to mountings for telescopes and the like, the telescope or other instrument is preferably so located in the mounting that its axis passes through the intersection of the X—X and Y—Y axes. Such an embodiment of the invention is illustrated in Figures 5 and 6, in which reference character 30 designates the telescope which is mounted in a frame composed of the casing 31 and the bar 32 secured by machine screws to 31. This frame is supported by trunnions 33 in a gimbal frame 34, which, in turn, is pivotally mounted in a support 35 by trunnions 36. The support 35 is provided with legs 37 having feet 38 of rubber or other resilient material for taking up vibrations such as may be caused by the aeroplane motor or other machinery.

A gyrostat wheel 40 is mounted to rotate about the casing of telescope 30, being supported on this casing by ball-bearings 41 and 42. The gyrostat wheel is driven by an electric motor, the armature 43 and commutator 44 of which are rotatably mounted on the casing of the telescope by the same ball-bearings, 41 and 42. The field structure 45 of the motor is rigidly secured in the frame 31, and the brushes 46 of the motor are mounted in suitable brush supports secured to the same frame. Electric current is supplied to the brushes and field winding by conductors associated with terminals 47 and 48 mounted on the frame 31. When potential is applied to these terminals, the armature commences to rotate on bearings 41 and 42 and thus drives the gyrostat wheel 40.

Precession of the gyrostat about the X—X and Y—Y axes may be brought about by the pulley and elastic-band mechanisms A and B, in the manner described with reference to Figures 1 to 4, inclusive, and by the application of the proper amount of torque to these axes this precession may be caused to take place in any desired direction. Any object with reference to which the aeroplane is moving with substantially uniform velocity and direction, may, therefore, be retained for a considerable period of time within the field of view of the telescope, and by particularly accurate adjustments of the torques produced by A and B may actually be caused to remain substantially stationary with reference to the cross-hairs of the telescope.

It will thus be seen that in both forms of embodiment of the invention, the movements of the optical instruments are governed by the gyroscopic action of the gyrostat wheel. The rolling or other irregular motion of the aeroplane or other body on which the instrument is mounted, is prevented from changing the alignment or direction of the instrument, owing to the gyroscopic action, whereby the axis of the gyroscope is held constant in direction irrespective of the movements of the support. Any desired uniform change in the direction of this axis may be brought about, however, by the application of torque to the X and Y axes of suspension, as hereinbefore explained. As long, therefore, as the speed and the direction of the aeroplane are held substantially constant, it is possible to bring about a movement of the axis of the instrument, such that the same will remain oriented at any desired point on the ground or on any other object, relatively to which the aeroplane is in substantially uniform motion. This point, therefore, may be observed or photographed with far greater accuracy than otherwise possible, and the use of slow, wide angle photographic lenses is made practicable.

Although I have herein shown and described only two specific forms of embodiment of the invention, it will be understood that many changes and modifications may be made therein without departing from the spirit and scope of the invention, it being my intention to claim the same broadly in whatever form its principle may be embodied.

What I claim is:

1. A camera mounting, comprising a gyrostat, a gimbal mounting therefor, and means associated with said mounting for applying substantially uniform torque to said gyrostat to cause substantially uniform precession of said gyrostat in any desired direction.

2. The method of holding a camera oriented on any object with reference to which said camera is in substantially uniform motion, which consists in operatively associating said camera with a gyrostat free to turn about axes at right angles to each other and causing predetermined precession of said gyrostat.

3. The method of holding a camera oriented on any object with reference to which said camera is in substantially uniform motion, which consists in operatively associating said camera with a gyrostat free to turn about axes at right angles to each other and applying substantially uniform torque to said gyrostat about said axes, so as to bring about precession of said gyrostat in accordance with the change in the direction between said object and camera.

4. The method herein described, which consists in mounting a photographic device in fixed relation to the wheel of a gyrostat, free to turn about axes intersecting at right angles, so that the direction of said device will remain unchanged irrespective of irregularities in the motion of the platform on which the gyrostat is mounted, and applying predetermined torque to the gyrostat about the said axes, so as to bring about a substantially uniform change of direction of the said device relatively to the said platform.

5. In combination, a camera, a mounting therefor comprising a gyrostat, and means associated therewith for causing precession of said gyrostat, said means comprising a member for creating torque on said gyrostat about an axis thereof, said means comprising an elastic member whereby said gyrostat, after having turned through any angle, may be returned to its initial position and caused to resume its precession with substantially the same angular velocity.

6. The method of obtaining an accurate photograph of any object from an aeroplane or other device moving at substantially uniform velocity and direction relatively to said object, by means of a camera operatively associated with a gyrostat mounted on the device, free to turn about intersecting axes, which consists in applying torques to said axes, so as to cause precession of said gyrostat, and varying the amounts and directions of said torques until the precession of said gyrostat is such that the said object remains substantially stationary in the field of view of said camera.

7. The method of taking photographs from an aeroplane which consists in causing a uniform motion of the camera to compensate for the motion of the aeroplane.

8. In combination, a camera, and means for mounting the same in an aeroplane, said means comprising a pair of gimbal frames free to rotate about axes intersecting at right angles to each other and means for stabilizing the camera.

9. In combination, a camera, and means for mounting the same in an aeroplane, said means comprising a pair of gimbal frames free to rotate about axes intersecting at right angles to each other, said point of intersection being at the center of mass of said camera and means for stabilizing the camera.

10. In combination, a camera, a mounting therefor comprising a gyrostat, means for causing precession of said gyrostat, and a sighting device operatively associated with the said camera and the said gyrostat.

11. In combination, a camera, a sighting device operatively associated with said camera, a mounting therefor comprising a gyrostat so positioned that the center of mass of the combination of gyrostat, sighting device and camera remains at the intersection of the axes of said mounting, and means for applying torques to said gyrostat so as to cause precession thereof.

12. In combination, a camera, a telescope associated therewith, a mounting therefor comprising a gyrostat for eliminating gravitational effects, and means for controlling the said gyrostat so that the image of the object to be photographed remains stationary in said telescope and also in the focal plane of said camera.

13. In combination, a camera, a telescope associated therewith, a gyrostatic means operatively connected with the said camera and the said telescope, and means for controlling said gyrostat so as to compensate for the relative motion between the image of the object to be photographed and an optical member on which said image is produced.

14. In combination, a camera, a sighting device therefor, gyrostatic means for eliminating gravitational effects on the said camera and the said sighting device, and means for both said camera and sighting device for causing the image of the object to be photographed to be stationary in both said camera and sighting device.

15. In combination, a camera, a sighting device therefor, a gyrostat connected with said camera and sighting device for keeping the said camera and sighting device oriented in any desired direction, a gimbal mounting for said gyrostat, camera and sighting device, and means operatively associated with said mounting for eliminating the relative motion between the image of the object to be photographed and the sensitized medium in said camera.

16. In combination, a camera, a sighting device therefor, a gyrostat operatively associated with the said camera and sighting device for maintaining the latter in any desired direction, a gimbal mounting for said gyrostat, camera and sighting device, and means for causing precession of said gyrostat so that the object to be photographed remains substantially stationary in the field of view of said camera.

17. In combination, a camera and means for mounting and controlling the same upon aircraft comprising means for stabilizing the camera to avoid irregular movement thereof, and means for imparting a predetermined motion to the camera.

18. Apparatus for taking photographs from moving vehicles comprising a camera, means for moving the camera to compensate for travel of the vehicle to eliminate or control relative movement between the image of the object to be photographed and a member on which said image is produced, and a sighting device mounted for movement in unison with the camera whereby the operator can observe the extent of the relative movement referred to.

19. Apparatus for taking photographs from moving vehicles comprising a camera, means for moving the camera to compensate for travel of the vehicle to eliminate or control relative movement between the image of the object to be photographed and a member on which said image is produced, a sighting device mounted for movement in unison with the camera whereby the operator may observe the extent of the relative movement referred to, and means for adjusting the rate of movement of the camera and sighting device.

20. Apparatus for taking photographs from moving vehicles comprising a camera, means for moving the camera to compensate for travel of the vehicle to eliminate or control relative movement between the image of the object to be photographed and a member on which said image is produced, a sighting device mounted for movement in unison with the camera whereby the operator may observe the extent of the relative movement referred to and means for independently adjusting the rate of movement of the camera in either of two directions at right angles to one another.

21. The method of procuring a photograph of an object when the object and camera are in motion relatively to each other, which consists in observing the object to be photographed through a sighting device, causing the optical members of the sighting device to undergo such movement that the object as observed through the device will appear to be stationary, impressing the same movement on the optical members of the camera, and thereupon making the exposure.

22. Apparatus for taking photographs from moving platforms, such as air craft, comprising a camera, a sighting device, mechanism for concurrently eliminating relative motion between the images of the landscape to be photographed and the optical members of the camera and sighting device on which said images are produced, and a gyrostatic stabilizing device for so mounting the camera and sighting device on the aircraft or other moving platform, that the same will not be affected by irregularities in the movement of the platform.

23. In combination, a camera, a sighting device therefor, gyrostatic means for eliminating gravitational effects on the said camera and the said sighting device, and means for both said camera and sighting device for causing the image of the object to be photographed to be stationary in both said camera and sighting device.

24. Apparatus for taking photographs from moving vehicles, such as aircraft comprising a camera and sighting device, and mechanism for eliminating relative motion between the image of the landscape to be photographed and a member on which said image is produced, comprising a gyrostatic stabilizing device so combined with the camera and sighting device on the moving vehicle that the same will not be affected by irregularities in the movement of the vehicle.

In testimony whereof I have affixed my signature to this specification.

HEREWARD LESTER COOKE.